US010670808B1

(12) United States Patent
Trail (10) Patent No.: US 10,670,808 B1
(45) Date of Patent: Jun. 2, 2020

(54) SYSTEMS AND METHODS FOR ALTERING AN ALIGNMENT OF LIGHT FROM A LIGHT PROJECTOR WITH A WAVEGUIDE

(71) Applicant: Facebook Technologies, LLC, Menlo Park, CA (US)

(72) Inventor: Nicholas Daniel Trail, Bothell, WA (US)

(73) Assignee: Facebook Technologies, LLC, Menlo Park, CA (US)

(*) Notice: Subject to any disclaimer, the term of this patent is extended or adjusted under 35 U.S.C. 154(b) by 0 days.

(21) Appl. No.: 16/033,182

(22) Filed: Jul. 11, 2018

Related U.S. Application Data

(60) Provisional application No. 62/620,436, filed on Jan. 22, 2018.

(51) Int. Cl.
| | |
|---|---|
| *G02B 6/14* | (2006.01) |
| *G02B 6/12* | (2006.01) |
| *G02B 27/01* | (2006.01) |
| *G02B 6/122* | (2006.01) |

(52) U.S. Cl.
CPC ............ *G02B 6/14* (2013.01); *G02B 6/122* (2013.01); *G02B 27/0172* (2013.01); *G02B 2027/0178* (2013.01)

(58) Field of Classification Search
CPC ...... G02B 6/14; G02B 6/122; G02B 27/0172; G02B 2027/0178
USPC .......................................................... 385/129
See application file for complete search history.

(56) References Cited

U.S. PATENT DOCUMENTS

| 7,367,681 B2 * | 5/2008 | Harboe ............... H04N 9/3147 348/383 |
| 7,806,533 B2 * | 10/2010 | Boute ................... H04N 7/144 348/14.01 |
| 8,508,474 B2 * | 8/2013 | Machida .............. G06F 3/0346 345/156 |
| 8,611,014 B2 | 12/2013 | Valera et al. |
| 10,021,379 B2 * | 7/2018 | Bridges ................ G01S 7/4813 |
| 10,156,720 B2 * | 12/2018 | Ando ..................... B60K 35/00 |

(Continued)

OTHER PUBLICATIONS

Fitzsimmons, Michelle, "Hands On: Microsoft Hololens", accessed at https://www.techradar.com/reviews/wearables/microsoft-hololens-1281834/review, Jun. 14, 2017, 12 pages.

(Continued)

*Primary Examiner* — Akm E Ullah
(74) *Attorney, Agent, or Firm* — FisherBroyles, LLP (57) ABSTRACT

The disclosed system may include (1) a light projector that projects a two-dimensional image, (2) an optical waveguide that carries at least some light from the light projector before emitting at least a portion of the light from the optical waveguide, (3) a two-dimensional light detector that receives at least some of the portion of the light emitted from the optical waveguide, and (4) a controller that (a) causes the light projector to project light from at least one of multiple pixels, (b) receives information from the two-dimensional light detector based on light received at the two-dimensional light detector from the at least one of the multiple pixels, and (c) causes an alteration in an alignment of the light from the light projector relative to the optical waveguide based on the information. Various other systems and methods are also disclosed.

15 Claims, 10 Drawing Sheets

(56) References Cited

U.S. PATENT DOCUMENTS

| | | | |
|---|---|---|---|
| 2012/0068609 A1* | 3/2012 | Ide | G02B 6/12004 |
| | | | 315/152 |
| 2012/0212400 A1* | 8/2012 | Border | G02B 27/017 |
| | | | 345/8 |
| 2013/0278631 A1* | 10/2013 | Border | G02B 27/017 |
| | | | 345/633 |
| 2016/0187654 A1* | 6/2016 | Border | G02B 5/04 |
| | | | 359/567 |

OTHER PUBLICATIONS

Marvin, Rob, "Snapchat Spectacles: Everything You Need to Know", accessed at https://www.pcmag.com/article/350013/snapchat-spectacles-everything-you-need-to-know, Feb. 21, 2017, 9 pages.

Krees et al., "Diffractive and Holographic Optics as Optical Combiners in Head Mounted Displays", UbiComp'13, Sep. 8-12, 2013,Zurich, Switzerland, pp. 1479-1482.

* cited by examiner

SYSTEMS AND METHODS FOR ALTERING AN ALIGNMENT OF LIGHT FROM A LIGHT PROJECTOR WITH A WAVEGUIDE

CROSS REFERENCE TO RELATED APPLICATION

This application claims the benefit of U.S. Provisional Application No. 62/620,436, filed Jan. 22, 2018, the disclosure of which is incorporated in its entirety, by this reference.

BACKGROUND

Near-eye displays (NEDs), which may include devices providing a viewable display located near one or both eyes of a single viewer (e.g., including, but not limited to, head-mounted displays (HMDs), helmet-mounted displays, and optical head-mounted displays (OHMDs), each of which may be stereographic or monocular in nature), may employ an optical waveguide into which a light-projecting device (e.g., a liquid-crystal-on-silicon (LCoS) microdisplay) may project light. In turn, the optical waveguide may carry and subsequently emit the light received from the light-projecting device toward an eye of the viewer. In some cases, NEDs may provide the viewer with a virtual reality (VR), augmented reality (AR), and/or mixed reality (MR) display useful for presentation of navigational information, educational material, entertainment, and/or other image content.

To facilitate proper operation of the NED, in some examples, the optical path between the light-projecting device and the waveguide may be aligned or calibrated during a manufacturing or testing phase of the product prior to shipment of the product to a distributor, retailer, or purchaser to ensure the best possible viewing experience for the viewer. However, in some situations, this alignment or calibration may be disrupted after the NED has left the factory due to a number of circumstances, such as physical impacts to the device, changes in environmental factors (e.g., temperature), and so on. Such circumstances may thus adversely affect the overall performance of the NED.

SUMMARY

As will be described in greater detail below, the instant disclosure describes systems and methods for aligning a light projector with a waveguide, such as those that may be employed in a near-eye display (NED). In one example, a system may include (1) a light projector that projects a two-dimensional image, where the light projector includes multiple pixels, (2) an optical waveguide optically coupled to the light projector, where the optical waveguide carries at least some light from the light projector before emitting at least a portion of the light from the optical waveguide, (3) a two-dimensional light detector that is optically coupled to the optical waveguide and receives at least some of the portion of the light emitted from the optical waveguide, and (4) a controller that may (a) cause the light projector to project light from at least one of the multiple pixels, (b) receive information from the two-dimensional light detector based on light received at the two-dimensional light detector from the at least one of the multiple pixels, and (c) cause an alteration in an alignment of the light from the light projector relative to the optical waveguide based on the information. In some examples, (1) the system may also include an actuator that alters an optical alignment of the light projectors with the optical waveguide, and (2) the controller may cause the alteration in the alignment of the light from the light projector by causing the actuator to alter the optical alignment of the light projector based on the information. In other embodiments, the controller may cause the alteration in the alignment of the light from the light projector by causing the light projector to alter a position of the two-dimensional image relative to the multiple pixels.

In some embodiments, the optical waveguide may carry the at least some light from the light projector via total internal reflection, the optical waveguide may generate multiple exit pupils, each of the multiple exit pupils may include at least some of the portion of the light emitted from the optical waveguide, and the multiple exit pupils may define an eyebox for a first eye of a viewer.

In some examples, the two-dimensional light detector may be optically coupled to the optical waveguide such that the two-dimensional light detector receives the at least some of the portion of the light emitted from the optical waveguide external to the eyebox for the first eye of the viewer. Further, in some embodiments, the two-dimensional light detector may be mechanically coupled to a second light projector that is optically coupled to the optical waveguide. In some examples, the multiple exit pupils may further define an eyebox for a second eye of the viewer, the light projector may be optically coupled to a portion of the optical waveguide that generates the multiple exit pupils for the eyebox for the first eye of the viewer, and the two-dimensional light detector may be optically coupled to a portion of the optical waveguide that generates the multiple exit pupils for the eyebox for the second eye of the viewer.

In some further examples, (1) the system may further include a second light projector that projects a second two-dimensional image, where the second light projectors include multiple pixels, and (2) the controller may (a) cause the second light projector to project light from at least one of the multiple pixels of the second light projector, (b) receive second information from the two-dimensional light detector based on light received at the two-dimensional light detector from the at least one of the multiple pixels of the second light projector, and (c) cause an alteration in an alignment of the light from the second light projector relative to the optical waveguide based on the second information. Moreover, in some embodiments, (1) the multiple exit pupils may further define an eyebox for a second eye of the viewer, (2) the first light projector may be optically coupled to a portion of the optical waveguide that generates the multiple exit pupils for the eyebox for the first eye of the viewer, (3) the second light projector may be optically coupled to a portion of the optical waveguide that generates the multiple exit pupils for the eyebox for the second eye of the viewer, and (4) the two-dimensional light detector may be optically coupled to the portion of the optical waveguide that generates the multiple exit pupils for the eyebox for the second eye of the viewer.

In some embodiments, the two-dimensional light detector may be optically coupled to the optical waveguide such that the two-dimensional light detector receives the at least some of the portion of the light emitted from the optical waveguide in the eyebox for the first eye of the viewer. Furthermore, in some examples, the two-dimensional light detector may be located external to a NED that includes the optical waveguide and the light projector. In some cases, the system may also include a charging device external to the NED that provides electrical charge to the NED, where the charging device includes the two-dimensional light detector. In some examples, the charging device may also include a second two-dimensional light detector for an eyebox for a second eye of the viewer. In some embodiments, the charging device may further include the controller.

In some examples, the optical waveguide also may pass at least some light received at a first side of the optical waveguide opposite the eyebox for the first eye of the viewer through the optical waveguide to the eyebox for the first eye of the viewer.

In one example, a system may include (1) a near-eye display including (a) a light projector that projects a two-dimensional image, where the light projector includes multiple pixels, and (b) an optical waveguide optically coupled to the light projector, where the optical waveguide carries at least some light from the light projector before emitting a portion of the light from the optical waveguide to an eyebox for an eye of a viewer, (2) a two-dimensional light detector that is optically coupled to the optical waveguide and receives at least some light emitted from the optical waveguide, and (3) a controller that may (a) cause the light projector to project light from at least one of the multiple pixels, (b) receive information from the two-dimensional light detector based on light received at the two-dimensional light detector from the at least one of the multiple pixels, and (c) cause an alteration in an alignment of the light from the light projector relative to the optical waveguide based on the information. In some embodiments, the near-eye display may also include at least one of the two-dimensional light detector or the controller. The system, in some examples, may also include a charging device that provides electrical charge to the near-eye display, where the charging device may include the two-dimensional light detector.

In another example, a method may include (1) causing a light projector to project light, where an optical waveguide carries at least some of the light from the light projector before emitting at least some of the light from the optical waveguide, (2) receiving, at a two-dimensional light detector that it optically coupled to the optical waveguide, at least some of the light emitted from the optical waveguide, (3) receiving information from the two-dimensional light detector based on the light received at the two-dimensional light detector, and (4) causing, based on the information, an alteration in an alignment of the light from the light projector relative to the optical waveguide. In some examples, causing the alteration in the alignment of the light from the light projector may include (1) determining, based on the information, a current location of the light received at the two-dimensional light detector, (2) comparing the current location to a previous location of light previously received at the two-dimensional light detector, and (3) causing the alteration in the alignment based on comparing the current location to the previous location.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to system and methods for aligning a light projector with a waveguide. As will be explained in greater detail below, embodiments of the instant disclosure may facilitate aligning a light projector with an optical waveguide to which the projector is optically coupled (e.g., to present images to a user, such as by way of a near-eye display (NED)). Such alignment, in some examples, may be performed automatically (e.g., periodically, in response to charging the device, and so on) after initial delivery of the device to a viewer to maintain or recover proper alignment of the light projector and the associated optical waveguide.

In some embodiments described in greater detail below, a relative alignment of two or more light projectors, each of which is coupled to a waveguide (e.g., as what may be employed in a NED) or other common coordinate framework, may be performed so that visual information provided by the light projectors (e.g., virtual objects, text, and the like) may be properly perceived by the eyes of a viewer via the waveguide. For example, light projectors for different eyes of the viewer should be properly aligned vertically and horizontally so that the resulting image will not be blurred, and will appear at the intended distance or depth from the perspective of the viewer. In other examples, multiple light projectors for the same eye of the viewer (e.g., separate red, green, and blue projectors) should be properly aligned vertically and horizontally so that the image does not appear blurred chromatically to the user. Other situations in which one or more light projectors, or the light emitted therefrom, may benefit from ensuring proper alignment relative to the waveguide are also possible.

The following will provide, with reference to FIGS. 1-10, detailed descriptions of various systems and methods for aligning a light projector with an optical waveguide. For example, a description of an exemplary system providing such functionality is presented in conjunction with FIG. 1. A brief discussion of an exemplary NED in which various alignment systems and methods may be used is provided in reference to FIG. 2. With respect to FIGS. 3-6, a discussion is presented regarding various aspects of several embodiments of alignment systems involving light detectors that are incorporated within a NED. A description of exemplary alignment systems in which the light detectors employed are external to the NED is set forth in connection with FIGS. 7 and 8. An exemplary alignment system that may incorporate a calibration control module executable by a physical processor is described in conjunction with FIG. 9. An exemplary method for aligning a light projector with an associated waveguide, possibly provided within the aforementioned systems, is discussed in connection with FIG. 10.

Figure 1:
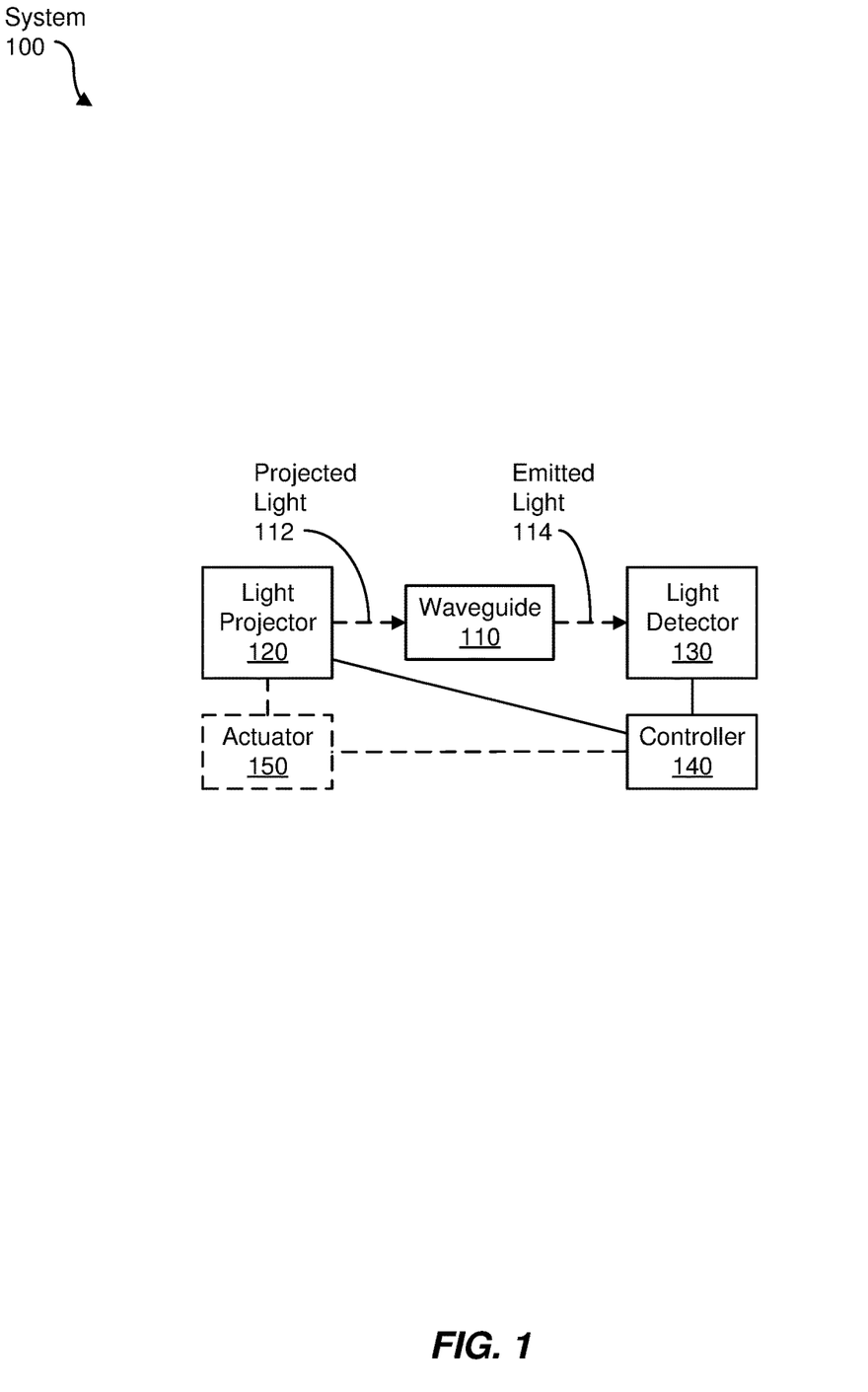
FIG. 1 is a block diagram of an exemplary system for aligning a light projector with a waveguide.

FIG. 1 is a block diagram of an exemplary system 100 for aligning a light projector 120 with an optical waveguide 110. In some embodiments, light projector 120 may project a two-dimensional image by way of multiple pixels. For example, light projector 120 may be any light projection device that may be optically coupled with optical waveguide 110, including, but not limited to, a light scanning device (e.g., a liquid-crystal-on-silicon (LCoS) microdisplay, a fiber scanning display (FSD), or a two-dimensional scanning laser or superluminescent diode (SLED) source), a direct emission source (e.g., a micro-light-emitting-diode (microLED) display, a SLED display, or a laser-based direct emission display), and the like. In some embodiments, light projector 120 may be optically coupled with optical waveguide 110 using one or more lenses, mirrors, and/or other optical elements.

In some examples, optical waveguide 110 may receive projected light 112 from light projector 120 and carry at least some of the received light therewithin (e.g., by way of total internal reflection (TIR) or other means). At least some of this light may be output from optical waveguide 110 as emitted light 114. Some of emitted light 114, in turn, may be presented for display to a viewer. In some examples, waveguide 110 may employ gratings or other structures to emit light to multiple exit pupils so that an eye of a viewer may view the two-dimensional image in emitted light 114 within an eyebox defined by the multiple exit pupils. In other examples, other techniques may be employed to present the two-dimensional image to an eye of the viewer.

Additionally, in some embodiments, at least a portion of emitted light 114 may be provided to a light detector 130. In some examples, light detector 130 may be a two-dimensional light detector. Further, in some embodiments, light detector 130 may be any kind of two-dimensional light detector that detects emitted light 114 received from optical waveguide 110 (e.g., a high-resolution optical camera, a low-resolution light detector, or the like). In some examples, light detector 130 may be optically coupled to optical waveguide 110 using one or more lenses, mirrors, and/or other optical complements. Also, in some embodiments, light detector 130 may provide information regarding which portion of light detector 130 that emitted light 114 receives. Moreover, light detector 130, in some examples, may be incorporated into a NED in which light projector 120 and waveguide 110 are located. In yet other examples, light detector 130 may reside external to such a NED.

System 100, in some embodiments, may also include a controller 140 that may communicate with light projector 120, light detector 130, and/or possibly one or more actuators 150 to perform the optical alignment described herein. Examples of controller 140 may include, but are not limited to, a hardware logic circuit and/or a processor that executes software or firmware instructions.

In some embodiments, light detector 130 may provide information regarding which portion of light detector 130 that emitted light 114 impacts. In various alignment examples, controller 140 may cause light projector 120 to illuminate one or more of the multiple pixels of light projector 120 (e.g., fewer than the total number of multiple pixels of light projector 120, or fewer than the number of pixels normally employed to provide a two-dimensional image) to produce projected light 112, and ultimately a portion of emitted light 114, to be received by light detector 130 for alignment purposes. In some examples, light detector 130 may provide information indicating a location of light detector 130 being illuminated by light generated by the one or more of the multiple pixels. In some embodiments, light detector 130 may indicate the location by way of identifying a light level impacting each pixel of light detector 130.

Based on the information received from light detector 130, controller 140, in some embodiments, may alter the alignment of light emitted from light projector 120 with waveguide 110, such as by using one or more actuators 150. In some examples, an actuator may be a component that physically moves (e.g., translates and/or rotates) another component. To adjust the optical alignment, actuator 150 may translate and/or rotate light projector 120 and/or any lenses, mirrors, or other optical complements employed to optically couple light projector 120 with waveguide 110. Examples of actuator 150 may include, but are not limited to, one or more microelectromechanical system (MEMS) actuators.

In some examples, controller 140 may calculate a location of the light currently received at light detector 130 based on the information received from light detector 130, and then may compare the location of the current location with the previous centroid of light received at light detector 130. In some examples, the previous location may be associated with a satisfactory alignment of light projector 120 with waveguide 110. Based on the comparison of the current and previous locations, controller 140 may then provide one or more control signals to actuator 150 to alter the optical coupling of light projector 120 to waveguide 110, or may shift the location of the light emitted from light projector 120, as described above. In some examples, controller 140 may then cause light projector 120 to emit light from the one or more multiple pixels to determine whether the portion of emitted light 114 received at light detector 130 is located in an expected area of light detector 130 (e.g., corresponding to the previous location), thus potentially indicating that the optical alignment of light projector 120 and waveguide 110 is appropriate. In some examples, the location of light received at light detector 130 may be determined by ascertaining the location of the centroid of the light received at light detector 130. As employed herein, a centroid, in some examples, may be a geometric center of a shape (e.g., the shape of the light as received at the light detector 130). In other embodiments, the location of light received at light detector 130 may be determined by way of detecting an optical flow (e.g., using an edge detector or other circuit to detect an apparent pattern of movement of one or more edges or other features) of the light received at light detector 130, such as that employed in some optical input devices (e.g., computer mice). In yet other examples, the location of light received at light detector 130 may be determined using an average of multiple edges and/or centers of the received light to determine differences in locations. Other methods of determining or estimating the previous and current locations of the light received at light detector 130 may be used in other embodiments.

In some other embodiments, controller 140 may alter an alignment of light projector 120 with waveguide 110 without the use of actuator 150. For example, controller 140, in response to the information received from light detector 130, may generate one or more control signals causing light projector 120 to alter how light projector 120 generates the two-dimensional images during normal operation. For example, controller 140 may alter the position of the generated two-dimensional images relative to the multiple pixels of light projector 120 (e.g., by moving the two-dimensional images along a horizontal and/or vertical axis within a viewing frame defined by the pixels of light projector 120).

Figure 2:
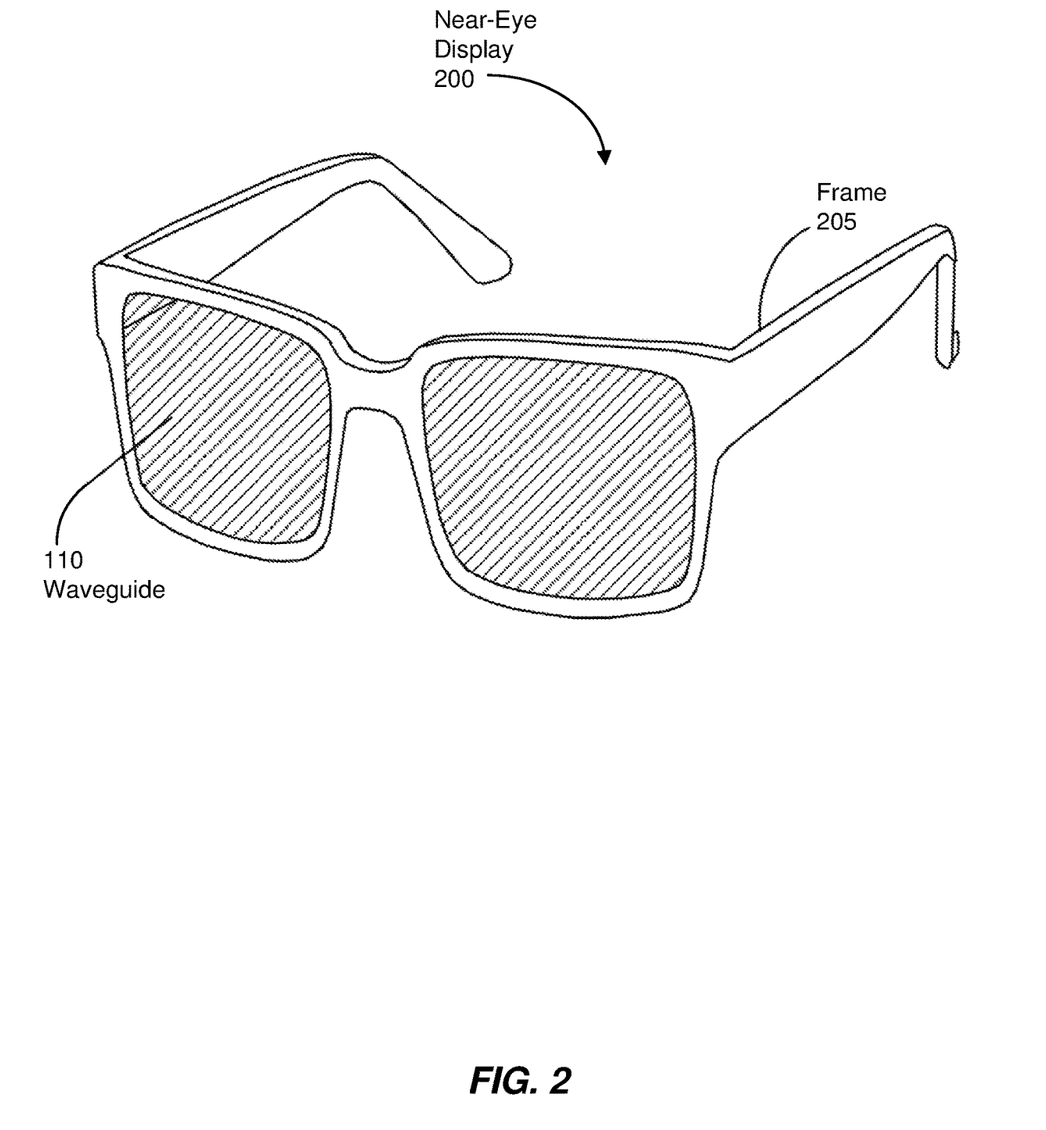
FIG. 2 is a perspective view of an exemplary near-eye display (NED) that may employ one or more systems or methods described herein.

System 100 may be implemented in a variety of display systems, including different types of NEDs. FIG. 2 is a perspective view of an exemplary NED 200 that may employ one or more systems (e.g., system 100) or methods described herein. In the example of FIG. 2, NED 200 may be in the form of a set of eyeglasses having a frame 205 holding two waveguides 110, one waveguide 110 for each eye of the viewer. In some examples, waveguides 110 of NED 200 may be optically separate waveguides 110, a single waveguide 110, or two waveguides 110 that are optically linked, such as by way of an optical bridge or link. While the embodiments described in greater detail below are presumed to be employed in the environment of NED 200, other types of NEDs (e.g., head-mounted displays (HMDs)) may employ versions of the various systems and methods described herein.

Figure 3:
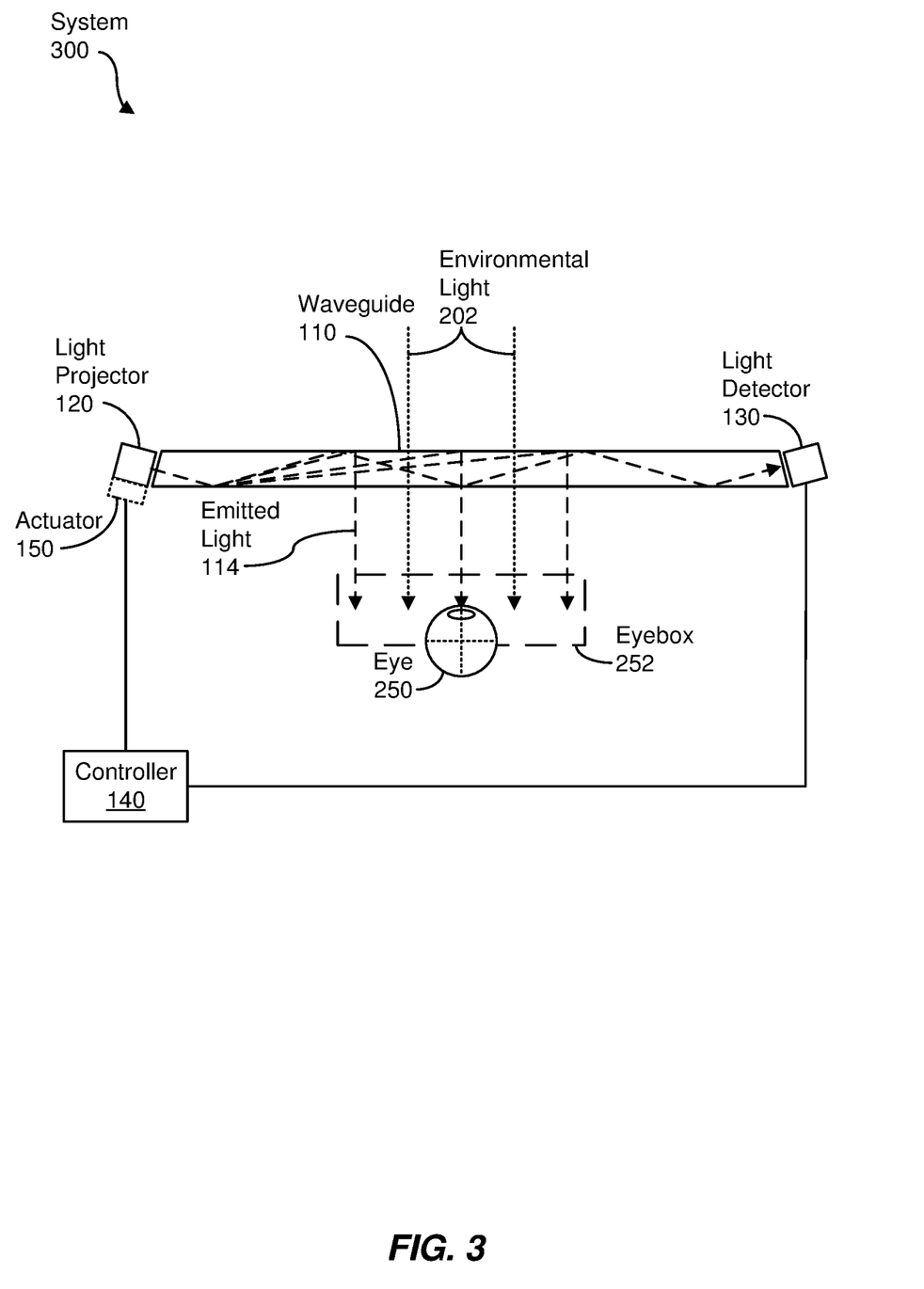
FIG. 3 is a top view of an exemplary system for aligning a light projector with a waveguide in a NED.

FIG. 3 is a top view of an exemplary system 300 for aligning light projector 120 with waveguide 110 in NED 200. In some embodiments, light projector 120 may include multiple pixels that project a two-dimensional image for a viewer wearing NED 200. Moreover, in some examples, light projector 120 may provide a high-definition (e.g., approximately 1K (1024) by 1K, or more) image using LCoS, microLED, or other projection technology. Further, light projector 120 may project that image (e.g., either directly or by way of one or more optical components) into waveguide 110 (e.g., an elongate waveguide), which may serve as a pupil relay and replication structure of a NED to allow a viewer to view the image easily within a defined volume of space relative to waveguide 110. Such a volume is often termed an "eyebox."

As indicated in FIG. 3, in some examples, light projected from light projector 120 may be carried within waveguide 110 using total internal reflection (TIR) for at least some distance within waveguide 110. In at least some examples, TIR may refer to the phenomenon in which a propagated optical beam or wave is completely reflected at a medium boundary (e.g., a surface of waveguide 110), which may occur when the beam or wave encounters the boundary at an angle of incidence greater than some critical angle with respect to the normal of the boundary. Further, in some embodiments, various structures (e.g., optical gratings) within or along an exterior of waveguide 110 may be employed to direct portions of the projected light toward an eye 250 of the viewer. In some examples, the light may be presented as emitted light 114 at multiple locations to form multiple exit pupils that form an eyebox 252 for eye 250. Consequently, eye 250 may be located within any portion of eyebox 252 for the viewer to view the image, thus allowing viewers of different physical characteristics or eye alignments to view the image using NED 200. In some examples, waveguide 110 may allow environmental light 202 from the surroundings of the viewer to pass through waveguide 110 to eye 250, including through eyebox 252, thus allowing the viewer to view the image within the context of the viewer's surroundings (e.g., in an AR or MR viewing mode).

As illustrated in FIG. 3, at least a portion of the light carried in waveguide 110 may bypass structures that direct the image to eyebox 252, thus continuing to be carried toward light detector 130. Light detector 130 may then receive that portion of emitted light 114 (e.g., directly, by way of a singlet lens, reflective surface, metamaterial lens, or via some other optical components). In some embodiments, a singlet lens may be an optical structure that includes a single optical element, such as a simple lens that may focus the received light onto light detector 130. While FIG. 3 depicts light projector 120 and light detector 130 as projecting and receiving light at opposing end surfaces of waveguide 110, other positions of light projector 120 and light detector 130 relative to waveguide 110 are also possible. For example, either or both of light projector 120 and light detector 130 may project or receive light into or out of a back surface (e.g., from the side closest eyebox 252), front surface (e.g., the same side at which environmental light 202 enters waveguide 110), top surface (e.g., an edge of waveguide 110 closest to the reader), or bottom surface of waveguide 110.

During an alignment operation, which may occur when the viewer powers up NED 200 in some examples, controller 140 may cause light projector 120 to project light from one or more of its multiple pixels such that light detector 130 may receive a portion of emitted light 114 (e.g., light forming an angular cone) that impacts some area less than the total detection area of light detector 130. In some embodiments, light detector 130 may include a two-dimensional light detector array that includes a small number of detection elements (e.g., a 64-by-64 detector array), such as what may be employed to detect optical flow in an optical mouse. In such examples, only a few of the detection elements of light detector 130 may receive emitted light 114, thus providing an indication of a current optical alignment of light projector 120 with waveguide 110. Moreover, a change in alignment of light projector 120 and waveguide 110 may result in a change in the particular detection elements of detector 130 that receive emitted light 114 from the one or more pixels of light projector 120 that are projecting light.

Controller 140, in some embodiments, may receive information indicating the particular detection elements of light detector 130 receiving emitted light 114. Based on that information, controller 140 may then determine a current location of the received light (e.g., by calculating a centroid of the light being received at light detector 130) and compare that location with a previous location of light received during a previous alignment operation (e.g., during a previous powering up of NED 200). From that comparison, in some embodiments, controller 140 may generate a control signal that causes actuator 150 to move light projector 120 in translation and/or rotation relative to waveguide 110 to alter the optical coupling between light projector 120 and waveguide 110. In some example, controller 140 may do so while receiving information from light detector 130 until the light centroid is at a desired location on light detector 130.

In other examples, controller 140 may communicate with light projector 120 to alter a position of a two-dimensional image (e.g., during normal operation) within a viewing frame projected by light projector 120, as opposed to mechanically moving light projector 120 using actuator 150.

Figure 4:
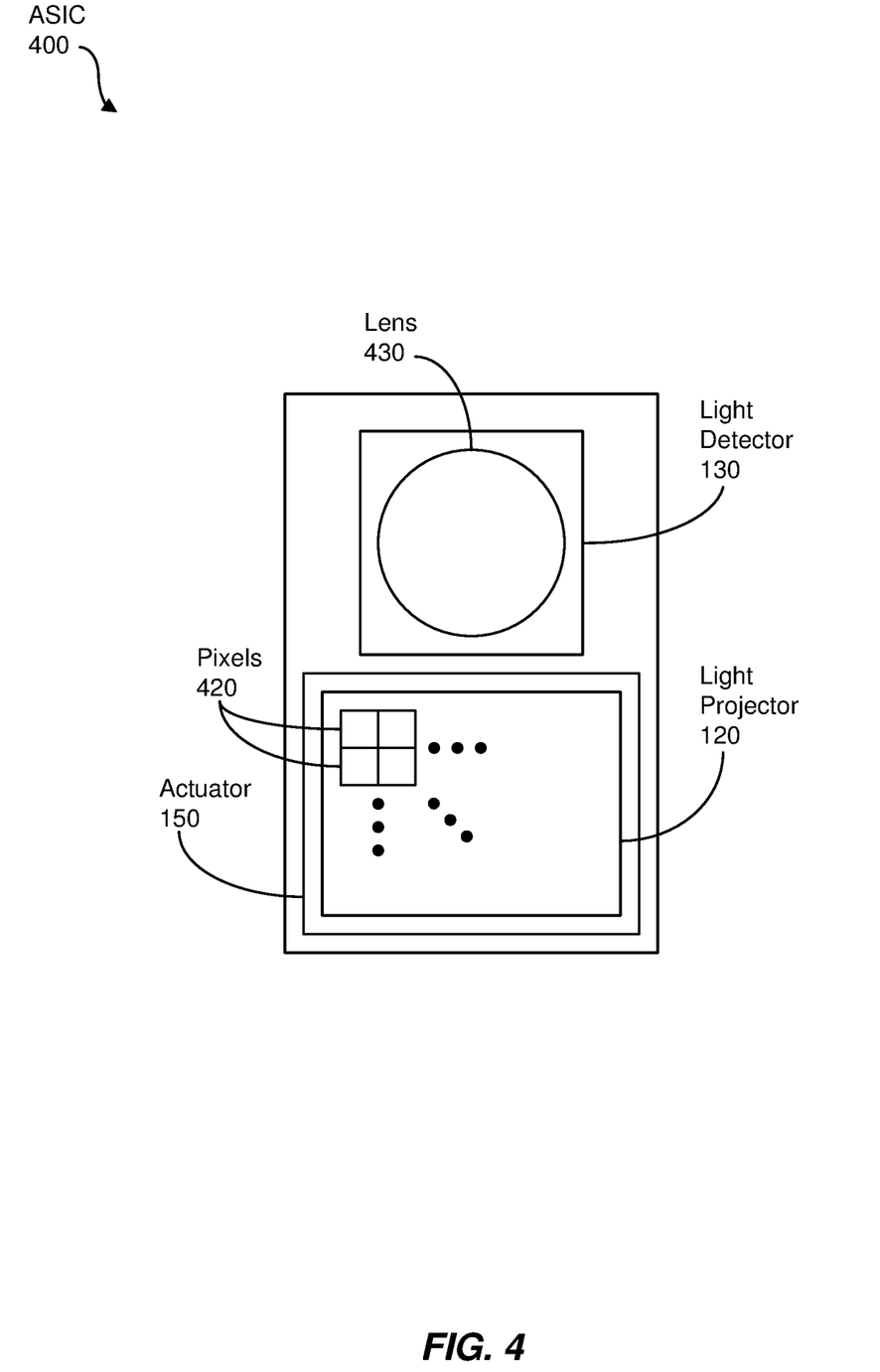
FIG. 4 is a simplified plan view of an application-specific integrated circuit (ASIC) housing a light projector and a light detector.

FIG. 4 is a simplified plan view of an exemplary application-specific integrated circuit (ASIC) 400 incorporating light projector 120 and light detector 130. In such examples, two ASICs 400 may be employed in conjunction with waveguide 110 such that light detector 130 of a first ASIC 400 may receive emitted light 114 originating from light projector 120 of a second ASIC 400 while light detector 130 of second ASIC 400 receives emitted light 114 from light projector 120 of first ASIC 400.

As depicted in FIG. 4, in some embodiments, ASIC 400 may be mechanically coupled to light projector 120 via one or more actuators 150 so that light projector 120 may be rotated and/or translated relative to ASIC 400. While a single light projector 120 is shown in FIG. 4, ASIC 400 may include multiple such light projectors 120 (e.g., three monochromatic (red, green, and blue) light projectors 120), possibly positioned adjacent each other on ASIC 400. Further, each light projector 120 may be coupled to the same one or more actuators 150, or may be coupled to its own one or more actuators 150, each of which may be individually controlled by controller 140 using one or more control signals. Additionally, each light projector 120 may include multiple pixels 420 (e.g., arranged in a two-dimensional array). Moreover, each light projector 120 may be coupled to one or most optical components to direct the projected light into waveguide 110. These optical components, in some embodiments, may be mechanically coupled to ASIC 400.

Also, in some examples, light detector 130 may include a small array (e.g., 64×64) of photodiodes or other light detection elements (not depicted in FIG. 4), and may be optically coupled with a lens 430 (e.g., a singlet lens), or with one or more other optical components so that emitted light 114 from waveguide 110 may be directed and/or focused onto light detector 130.

While FIG. 4 specifically indicates the use of ASIC 400 for integrating light projector 120 and light detector 130, other electronic structures (e.g., a system-on-a-chip (SOC) or a small printed circuit board (PCB)) may be employed in lieu of ASIC 400 in other embodiments. In some embodiments, use of a common ASIC 400 or silicon panel for light projector 120 and light detector 130 may facilitate use of the same optical elements or stack by both light projector 120 and light detector 130. In other examples, light projector 120 and light detector 130 may employ different optical elements, even though they utilize the same ASIC 400 or silicon panel. In yet other embodiments, light projector 120 and light detector 130 may be coupled to separates ASICs or silicon panels. In some examples, more than one light projector 120 (e.g., separate light projectors 120 for red, green, and blue light) may be incorporate on ASIC 400 with light detector 130. Other arrangements of one or more light projectors 120 and light detectors 130 relative to one or more ASICs 400 are also possible.

In some examples, while aligning a single light projector 120 relative to waveguide 110 may provide significant value to the quality of two-dimensional images provided to a viewer, aligning two separate light projectors 120 at different locations relative to waveguide 110 (e.g., for a single viewing eye) may be even more important in some examples, as two different light projectors 120 may be employed to generate portions (e.g., different areas or fields-of-view that can be tiled or summed together, different colors, etc.) of the same two-dimensional image being displayed to the viewer.

Figure 5:
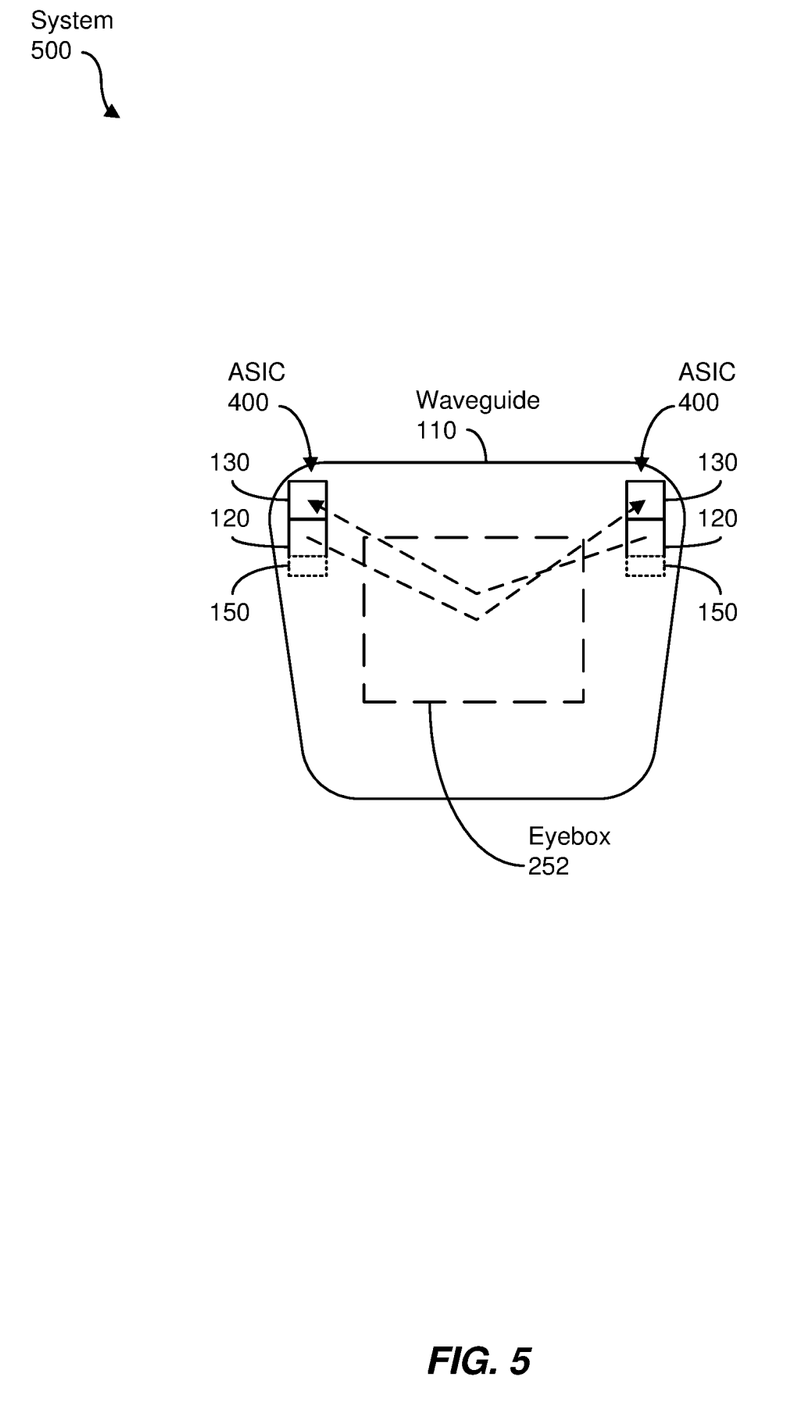
FIG. 5 is a back view of an exemplary system for aligning multiple light projectors optically coupled to a waveguide for an eye of a viewer.

FIG. 5 is a back view (e.g., from the viewpoint of a viewer using NED 200) of an exemplary system 500 for aligning multiple light projectors 120 optically coupled to a waveguide 110 for an eye of a viewer. As depicted in FIG. 5, two ASICs 400 are situated at approximately opposing ends of waveguide 110, but other relative arrangements of ASICs 400 (e.g., one ASIC 400 positioned along one end of waveguide 110, and another ASIC 400 positioned along the top of waveguide 110) may also be utilized in other examples. Moreover, while two ASICs 400 are utilized in system 500, greater numbers of ASICs 400 and/or light projectors 120 may be employed in a similar manner in other examples.

In such examples, light from one or more pixels of light projector 120 of first ASIC 400 (e.g., on the left-hand side of FIG. 5) may be carried and emitted to both eyebox 252 and to light detector 130 of second ASIC 400 (e.g., on the right-hand side of FIG. 5) for alignment purposes. Similarly, light from one or more pixels of light projector 120 of second ASIC 400 may be carried and emitted to both eyebox 252 and to light detector 130 of first ASIC 400. With controller 140 being coupled to both ASICs 400, the optical coupling of each light projector 120 with waveguide 110 may be properly aligned (e.g., different colors, different areas, or different fields-of-view of the same image co-aligned) so that a properly aligned two-dimensional image generated by light projectors 120 may be presented to the viewer.

Figure 6:
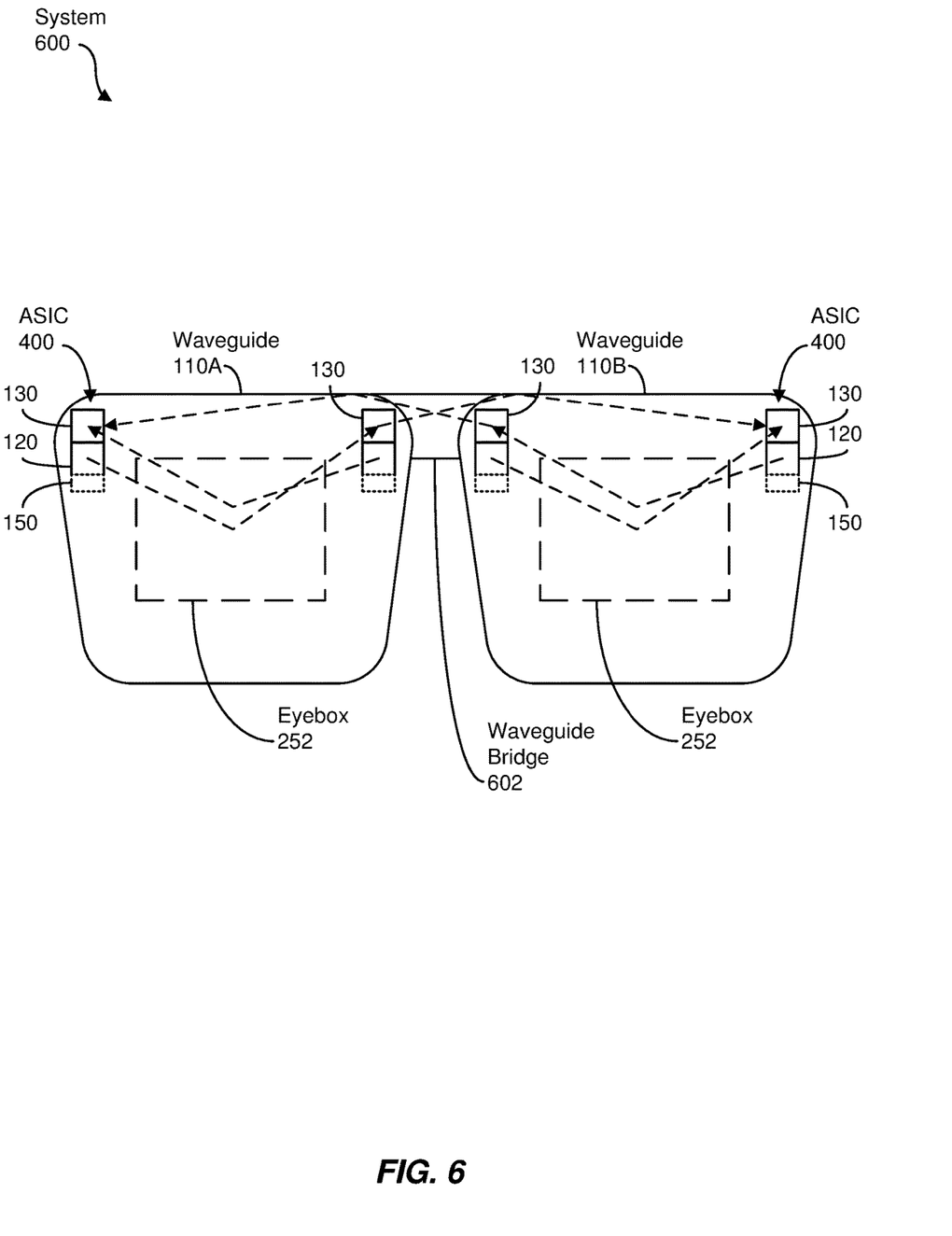
FIG. 6 is a back view of an exemplary system for aligning multiple light projectors optically coupled to one or more waveguides for both eyes of a viewer.

FIG. 6 is a back view of an exemplary system 600 for aligning multiple light projectors 120 optically coupled to one or more waveguides 110 for both eyes of a viewer. In the example illustrated in FIG. 6, four ASICs 400, two per waveguide 110A and 110B for eyebox 252 for each eye 250 of the viewer, are employed to provide four light projectors 120 (e.g., two light projectors 120 per waveguide 110, as shown in FIG. 5). However, other numbers of ASICs 400 or light projectors 120 (e.g., one per waveguide 110, three or more per waveguide 110, and so on) may be employed in other embodiments.

In addition, waveguides 110A and 110B may be optically linked by way of a waveguide bridge 602 that passes light emitted from one waveguide 110 into another. In other examples, waveguides 110A and 110B, along with waveguide bridge 602, may be implemented as a single contiguous waveguide 110. As a result of waveguides 110 for both eyes 250 being optically linked, a light detector 130 of one ASIC 400 for one waveguide 110A may receive emitted light 114 from a light projector 120 of another waveguide 110B. Consequently, a relative optical alignment of a light projector 120 of waveguide 110A compared to an optical alignment of a light projector 120 of waveguide 110B may be performed. Such alignment may be desirable in cases in which relative vertical and/or horizontal alignment of two-dimensional images presented to separate eyes 250 of the viewer is important.

The example systems of FIGS. 3-6 may employ light detectors 130 that are incorporated into NED 200, which may allow realignment of light projectors 120 relative to waveguide 110 before, during, and/or after normal use of NED 200 (e.g., presentation of two-dimensional images, as generated by an MR application). In lieu of, or in addition to, such embodiments, external light detectors 130 (e.g., light detectors not incorporated within NED 200) may be employed to facilitate optical alignment.

Figure 7:
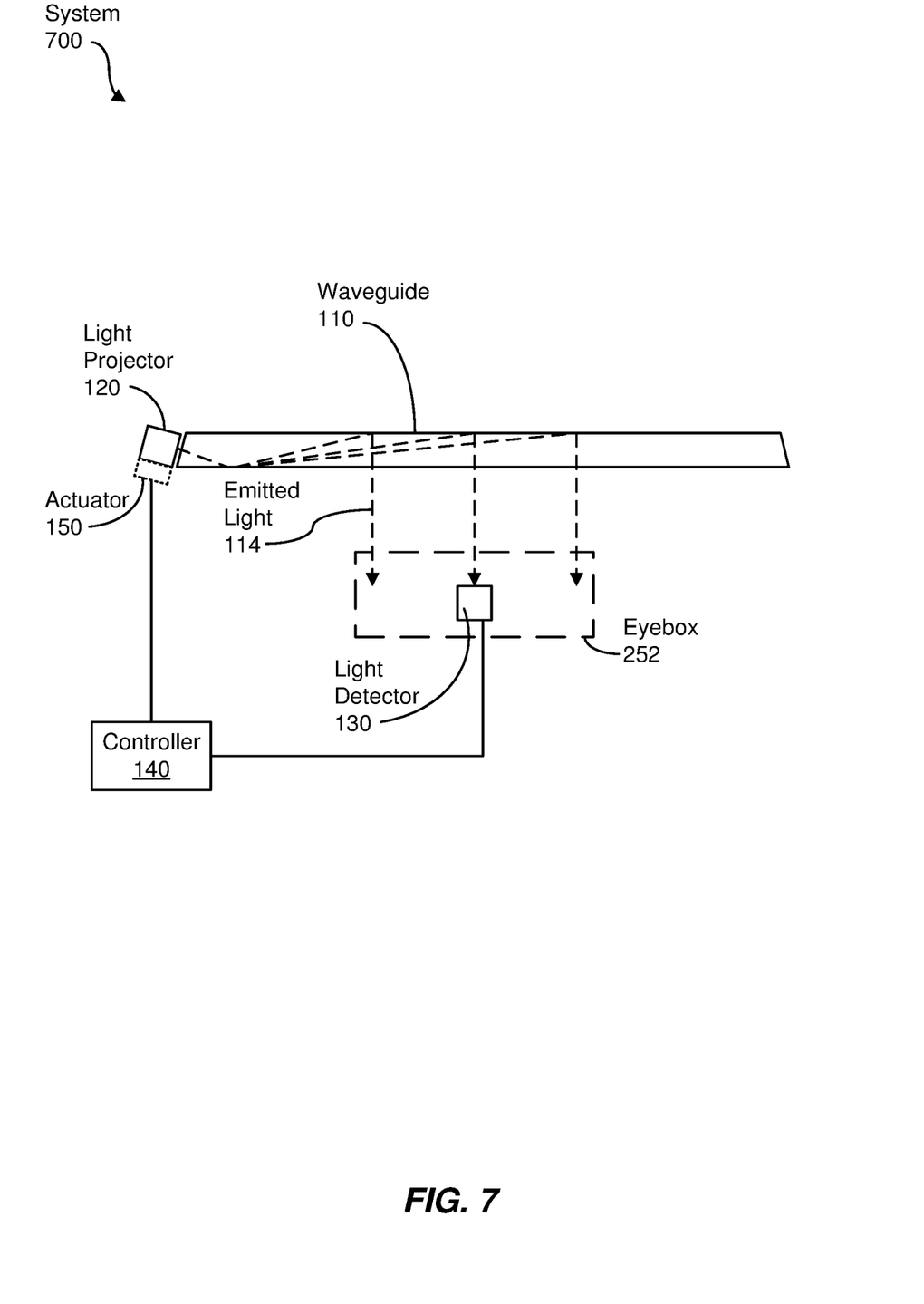
FIG. 7 is a top view of another exemplary system for aligning a light projector with a waveguide in a NED.

FIG. 7 is a top view of an exemplary system 700 for aligning light projector 120 with a waveguide 110 in NED 200 in which light detector 130 is located external to NED 200 (e.g., in a charging station or other device associated with NED 200). In such examples, an ASIC or other device may include light projector 120 and one or more actuators 150 (e.g., such as in ASIC 400), with or without a light detector 130 incorporated therein. In some embodiments, light detector 130 may include a detector array (e.g., as described above) or a camera (e.g., a low-definition or high-definition camera) located within eyebox 252 that receives emitted light 114 from waveguide 110, thus possibly allowing controller 140 to control the optical alignment of light projector 120 with waveguide 110 by detecting and analyzing emitted light 114 that would normally be received at eye 250 of the viewer.

Also, in some examples, one or more of the multiple pixels of light projector 120 may be used to project light to light detector 130, such as in the various examples noted above. In other embodiments, such as those in which a camera or similar device is employed for light detector 130, more of the pixels may be employed to produce a more intricate image (e.g., a pattern of dots, lines, etc., possibly of different colors) so that a potentially more precise relative alignment of one or more light projectors 120 coupled with waveguide 110 may be performed using controller 140.

Figure 8:
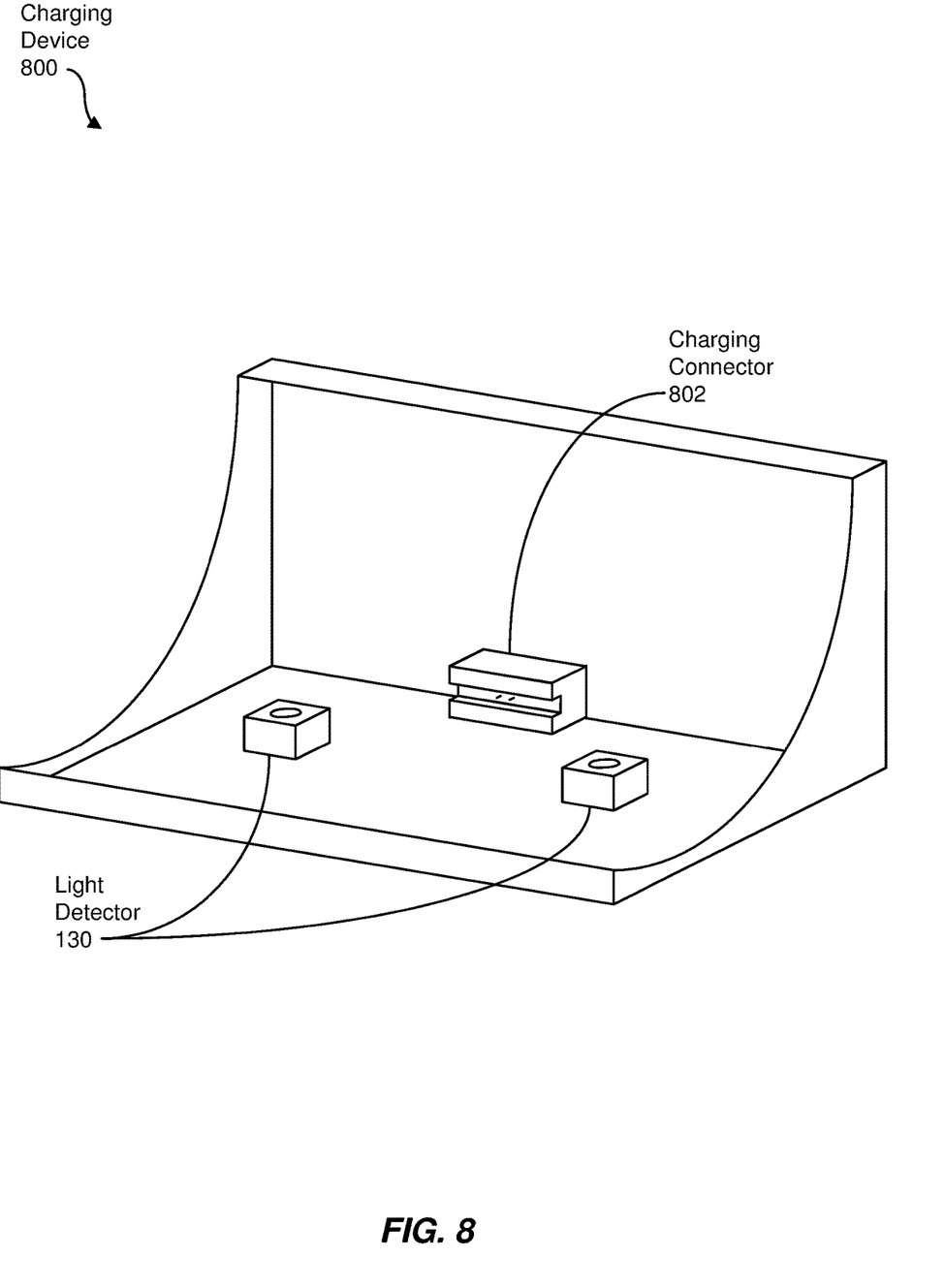
FIG. 8 is a perspective view of an exemplary charging device that facilitates alignment of a light projector with an optical waveguide in a NED.

FIG. 8 is a perspective view of an exemplary charging device 800 that facilitates alignment of one or more light projectors 120 with one or more waveguides 110 of NED 200. In some examples, a charging device may be a device that may provide electrical charge to NED 200 to charge a battery or other charge storage device to operate NED 200. In such embodiments, a body of charging device 800 may include a charging connector 802 (e.g., a micro Universal Serial Bus (micro-USB) connector, a general serial interface through direct contact, or the like) that may provide charge at a mating connector of NED 200 (e.g., at a bridge portion between waveguides 110, or through the arms of frame 205 of NED 200), presuming NED 200 is oriented face-up (e.g., external face of waveguides 110 facing generally upward) in charging device 800. Also included in charging device 800 may be light detectors 130 (e.g., low-definition or high-definition cameras) positioned in eyebox 252 of each waveguide 110 of NED 200. In some examples, plugging NED 200 into charging connector 802 may initiate the alignment process discussed above. Additionally, controller 140, in some embodiments, may be included in NED 200 or charging device 800.

Figure 9:
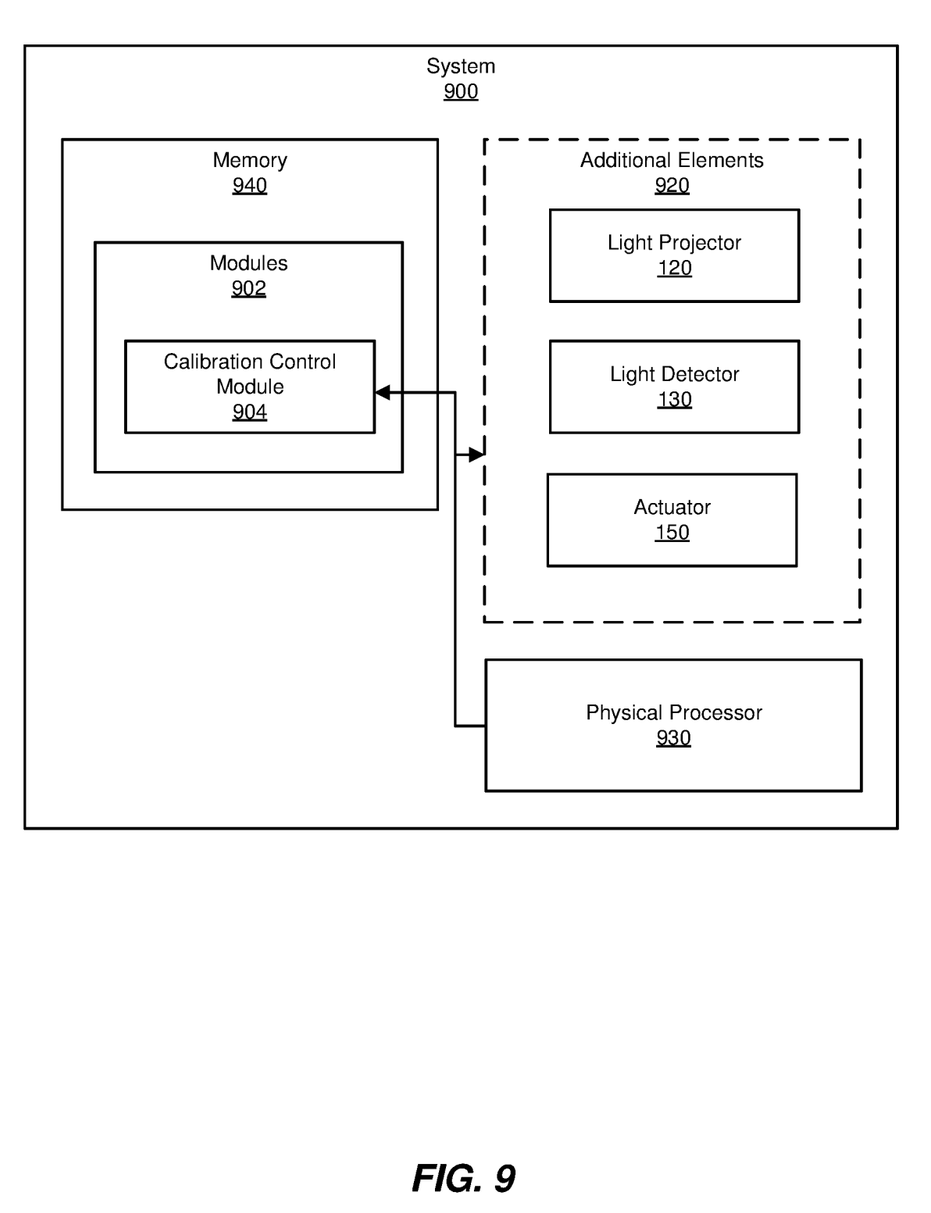
FIG. 9 is a block diagram of an exemplary system for aligning a light projector with an optical waveguide.

FIG. 9 is a block diagram of an exemplary system 900 for aligning a light projector (e.g., light projector 120) with an optical waveguide (e.g., waveguide 110) using a light detector (e.g., light detector 130), possibly by way of one or more actuators (e.g., actuator 150). As illustrated in FIG. 9, system 900 may include one or more modules 902 for performing one or more tasks. As will be explained in greater detail below, modules 902 may include a calibration control module 904, as well as possibly other modules 902 that facilitate normal operation of NED 200 (e.g., presentation to a viewer of two-dimensional images generated by an MR application) in which system 900 is integrated. Although illustrated as separate elements, one or more of modules 902 in FIG. 9 may represent portions of a single module or application.

Regarding modules 902, calibration control module 904, in some examples, may communicate with additional elements 920 (e.g., one or more light projectors 120, one or more light detectors 130, and/or one or more actuators 150) to align an optical coupling of light projectors 120 with one or more waveguides 110, as described above.

In certain embodiments, one or more of modules 902 in FIG. 9 may represent one or more software applications or programs that, when executed by a computing device, may cause the computing device to perform one or more tasks. One or more of modules 902 in FIG. 9 may also represent all or portions of one or more special-purpose computers configured to perform one or more tasks. Additionally, in some embodiments, one or more of modules 902 may include special-purpose hardware for performing some of the tasks ascribed to modules 902.

As illustrated in FIG. 9, example system 900 may also include one or more memory devices, such as memory 940. Memory 940 generally represents any type or form of volatile or non-volatile storage device or medium capable of storing data and/or computer-readable instructions. In one example, memory 940 may store, load, and/or maintain one or more of modules 902. As illustrated in FIG. 9, example system 900 may also include one or more physical processors, such as physical processor 930, that may access and/or modify one or more of modules 902 stored in memory 940. Additionally or alternatively, physical processor 930 may execute one or more of modules 902. In yet other example embodiments, one or more of modules 902, or portions thereof, instead may be implemented as hardware components not stored in memory 940, such as electronic circuitry for performing one or more tasks described above. Moreover, in some embodiments, portions of system 900 may be located in either or both of a NED 200 or another device associated with NED 200 (e.g., charging device 800).

Figure 10:
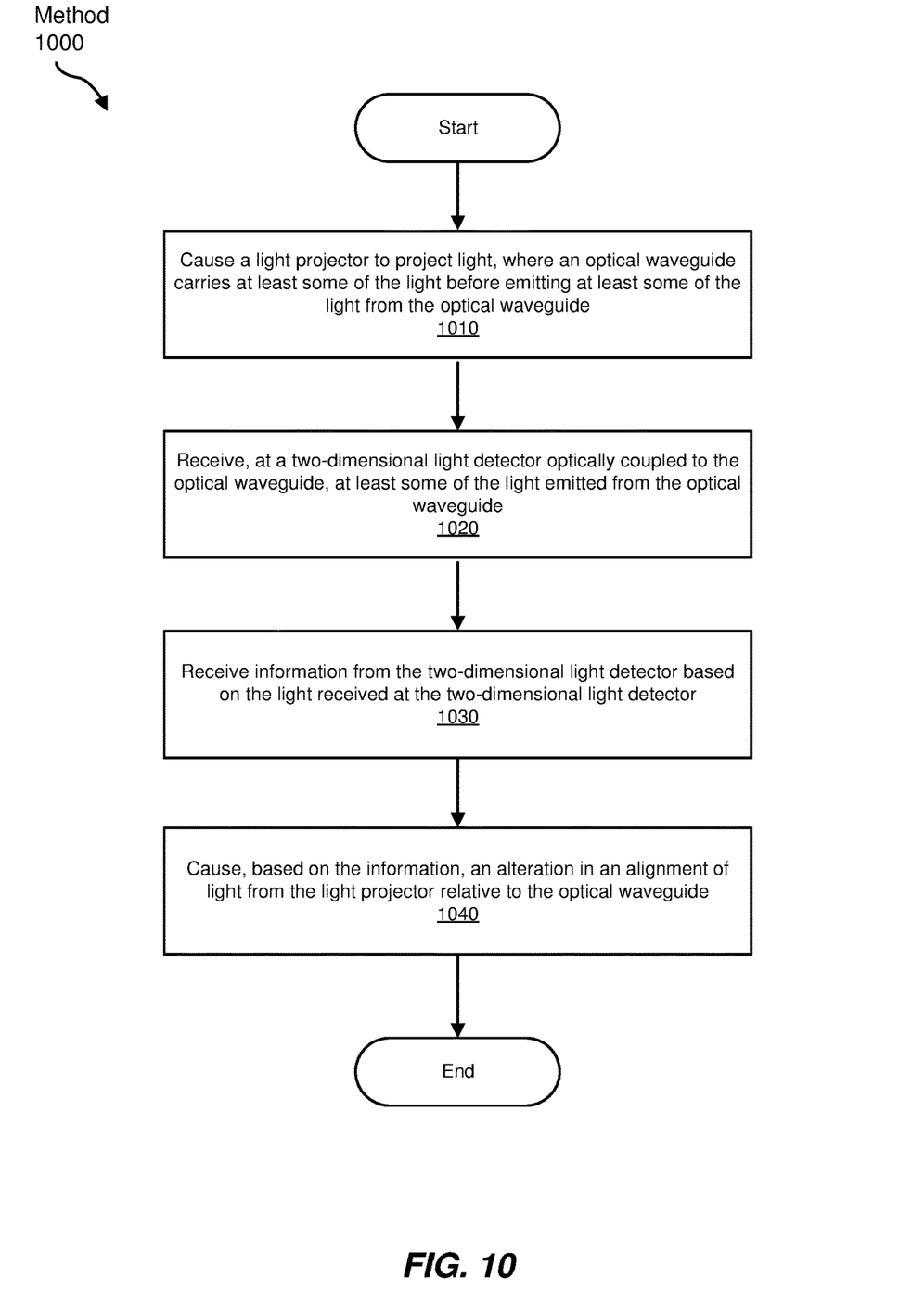
FIG. 10 is a flow diagram of an exemplary method of aligning a light projector with an optical waveguide.

FIG. 10 is a flow diagram of an exemplary method 1000 of aligning a light projector (e.g., light projector 120) with an optical waveguide (e.g., waveguide 110). In method 1000, at step 1010, a controller (e.g., controller 140) may cause the light projector to project light, where the optical waveguide carries at least some of the light before emitting at least some of that light from the optical waveguide. At step 1020, a two-dimensional light detector (e.g., light detector 130) optically coupled to the waveguide may receive at least some of the light emitted from the waveguide. The controller, at step 1030, may receive information from the two-dimensional light detector based on the light received at the two-dimensional light detector. At step 1040, the controller, based on the received information, may cause an alteration in an alignment of the light from the light projector relative to the optical waveguide. In some embodiments, the controller may cause the alteration by instructing an actuator (e.g., actuator 150) to alter an optical alignment of the light projector relative to the waveguide. In other examples, the controller may communicate with the light projector to alter a position within a viewing frame (e.g., relative to the pixels of the light projector) of two-dimensional images presented to a viewer during normal operation based on the information received from the two-dimensional light detectors, as discussed above.

As explained above in conjunction with FIGS. 1 through 10, various embodiments of the systems and methods described herein may facilitate alignment of a light projector with an optical waveguide, such as may be employed in a NED or other display device. Such alignment may be performed "in situ" (e.g., in a normal operating environment associated with the display device) or "offline" (e.g., in conjunction with a charging device or other device associated with the display device). Performing such alignment may remedy potential misalignment between the light projector and the optical waveguide that may occur through impacts to the device, temperature variations, and other physical or environmental effects that may otherwise degrade the images presented to the viewer. In some examples, this alignment capability may be exceptionally beneficial, such as in display devices in which two or more light projectors optically coupled with one or more waveguides contributed to provide the same or associated images to the viewer simultaneously. By following the various examples described above, proper optical alignment may be facilitated while maintaining a cost-effective, compact display system.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another, as described above. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

Embodiments of the instant disclosure may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A system comprising:
a light projector that projects a two-dimensional image, wherein the light projector comprises multiple pixels;
an optical waveguide optically coupled to the light projector, wherein the optical waveguide carries at least some light from the light projector before emitting at least a portion of the light from the optical waveguide;
a two-dimensional light detector that is optically coupled to the optical waveguide and receives at least some of the portion of the light emitted from the optical waveguide; and
a controller that:
causes the light projector to project light from at least one of the multiple pixels;
receives information from the two-dimensional light detector based on light received at the two-dimensional light detector from the at least one of the multiple pixels; and
causes an alteration in an alignment of the light from the light projector relative to the optical waveguide based on the information.

2. The system of claim 1, wherein:
the system further comprises an actuator that alters an optical alignment of the light projector with the optical waveguide; and
the controller causes the alteration in the alignment of the light from the light projector by causing the actuator to alter the optical alignment of the light projector based on the information.

3. The system of claim 1, wherein the controller causes the alteration in the alignment of the light from the light projector by causing the light projector to alter a position of the two-dimensional image relative to the multiple pixels.

4. The system of claim 1, wherein:
the optical waveguide carries the at least some light from the light projector via total internal reflection;
the optical waveguide generates multiple exit pupils;
each of the multiple exit pupils comprises at least some of the portion of the light emitted from the optical waveguide; and
the multiple exit pupils define an eyebox for a first eye of a viewer.

5. The system of claim 4, wherein the two-dimensional light detector is optically coupled to the optical waveguide such that the two-dimensional light detector receives the at least some of the portion of the light emitted from the optical waveguide external to the eyebox for the first eye of the viewer.

6. The system of claim 5, wherein the two-dimensional light detector is mechanically coupled to a second light projector that is optically coupled to the optical waveguide.

7. The system of claim 5, wherein:
the multiple exit pupils further define an eyebox for a second eye of the viewer;
the light projector is optically coupled to a portion of the optical waveguide that generates the multiple exit pupils for the eyebox for the first eye of the viewer; and
the two-dimensional light detector is optically coupled to a portion of the optical waveguide that generates the multiple exit pupils for the eyebox for the second eye of the viewer.

8. The system of claim 5, wherein:
the light projector comprises a first light projector;
the two-dimensional image comprises a first two-dimensional image;
the system further comprises
a second light projector that projects a second two-dimensional image, wherein the second light projector comprises multiple pixels;
the optical waveguide carries at least some light from the second light projector before emitting a portion of the light from the optical waveguide; and
the controller:
causes the second light projector to project light from at least one of the multiple pixels of the second light projector;
receives second information from the two-dimensional light detector based on light received at the two-dimensional light detector from the at least one of the multiple pixels of the second light projector; and
causes an alteration in an alignment of the light from the second light projector relative to the optical waveguide based on the second information.

9. The system of claim 8, wherein:
the multiple exit pupils further define an eyebox for a second eye of the viewer;
the first light projector is optically coupled to a portion of the optical waveguide that generates the multiple exit pupils for the eyebox for the first eye of the viewer;
the second light projector is optically coupled to a portion of the optical waveguide that generates the multiple exit pupils for the eyebox for the second eye of the viewer; and
the two-dimensional light detector is optically coupled to the portion of the optical waveguide that generates the multiple exit pupils for the eyebox for the second eye of the viewer.

10. The system of claim 4, wherein:
the two-dimensional light detector is optically coupled to the optical waveguide such that the two-dimensional light detector receives the at least some of the portion of the light emitted from the optical waveguide in the eyebox for the first eye of the viewer.

11. The system of claim 10, wherein the two-dimensional light detector is located external to a near-eye display that comprises the optical waveguide and the light projector.

12. The system of claim 11, further comprising:
a charging device external to the near-eye display that provides electrical charge to the near-eye display, wherein the charging device comprises the two-dimensional light detector.

13. The system of claim 12, wherein the charging device further comprises a second two-dimensional light detector for an eyebox for a second eye of the viewer.

14. The system of claim 12, wherein the charging device further comprises the controller.

15. The system of claim 4, wherein the optical waveguide further passes at least some light received at a first side of the optical waveguide opposite the eyebox for the first eye of the viewer through the optical waveguide to the eyebox for the first eye of the viewer.

* * * * *